United States Patent
McConnell et al.

(10) Patent No.: US 12,338,365 B2
(45) Date of Patent: Jun. 24, 2025

(54) PIGMENTED MULTIFUNCTIONAL BARRIER COATING COMPOSITIONS

(71) Applicant: B/E Aerospace, Inc., Winston-Salem, NC (US)

(72) Inventors: David C. McConnell, Annalong (GB); Thomas Martz, Winston-Salem, NC (US); Steven Poteet, Ashland, MA (US); Katherine Urena Pimentel, Manchester, CT (US); Irene W. Rexwinkle, Mill Creek, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/986,527

(22) Filed: Nov. 14, 2022

(65) Prior Publication Data
US 2024/0158644 A1    May 16, 2024

(51) Int. Cl.
  C09D 5/03    (2006.01)
  C09D 5/14    (2006.01)
  (Continued)

(52) U.S. Cl.
  CPC .............. C09D 5/035 (2013.01); C09D 5/14 (2013.01); C09D 7/20 (2018.01); C09D 7/41 (2018.01); C09D 7/48 (2018.01); C09D 7/61 (2018.01)

(58) Field of Classification Search
None
See application file for complete search history.

(56) References Cited

U.S. PATENT DOCUMENTS

| | | | |
|---|---|---|---|
| 7,645,824 B2 | 1/2010 | Hendriks et al. | |
| 7,825,171 B2 * | 11/2010 | Copeland | C09D 5/14 427/407.1 |

(Continued)

FOREIGN PATENT DOCUMENTS

| | | |
|---|---|---|
| CN | 103358638 A | 10/2013 |
| CN | 110305540 A | 10/2019 |

(Continued)

OTHER PUBLICATIONS

Anonymous: "Technical Application Note-Colour: Graphene Pigments", Oct. 1, 2018, pp. 1-11, Retrieved from internet: URL:https://www.appliedgraphenematerials.com/wp-content/uploads/2020/11/Technical-Application-Note-Colour-Graphene-Pigment-VI.1.pdf.

(Continued)

Primary Examiner — Michael P. Rodriguez
(74) Attorney, Agent, or Firm — Suiter Swantz IP

(57) ABSTRACT

Disclosed are pigmented multifunctional barrier coating compositions for application to components such as aircraft interior components. In embodiments, compositions include a base coating component in an amount from 5 to 40 weight percent of the composition, a solvent in an amount from 50 to 70 weight percent of the composition, and at least two performance components from an FST-resistive component in an amount from 0.1 to 5 weight percent of the composition, a UV-resistive component in an amount from 0.1 to 2 weight percent of the composition, an antimicrobial component in an amount from 0.1 to 5 weight percent of the composition, and a dye component in an amount less than 0.5 weight percent of the composition. The composition further includes pigment in an amount up to 10 weight percent of the composition for imparting a cosmetic appearance to the component such as a metallic appearance.

9 Claims, 3 Drawing Sheets

(51) Int. Cl.
*C09D 7/20* (2018.01)
*C09D 7/41* (2018.01)
*C09D 7/48* (2018.01)
*C09D 7/61* (2018.01)

(56) References Cited

U.S. PATENT DOCUMENTS

| | | | |
|---|---|---|---|
| 7,998,530 B2 * | 8/2011 | Batdorf | C09D 7/45 |
| | | | 427/384 |
| 2006/0246149 A1 | 11/2006 | Buchholz et al. | |
| 2016/0145465 A1 * | 5/2016 | Furutaka | B32B 27/308 |
| | | | 524/506 |
| 2019/0276680 A1 | 9/2019 | Baricos et al. | |
| 2021/0095138 A1 | 4/2021 | Gallahar | |
| 2022/0177711 A1 | 6/2022 | Wang et al. | |

FOREIGN PATENT DOCUMENTS

| | | |
|---|---|---|
| CN | 110640305 A | 1/2020 |
| EP | 4144804 A1 | 3/2023 |
| EP | 4144805 A1 | 3/2023 |
| WO | 2008106494 A1 | 9/2008 |
| WO | 2015139135 A1 | 9/2015 |
| WO | 2021003205 A1 | 1/2021 |

OTHER PUBLICATIONS

Extended European Search Report dated Apr. 26, 2024; European Application No. 23209778.2.

* cited by examiner

PIGMENTED MULTIFUNCTIONAL BARRIER COATING COMPOSITIONS

TECHNICAL FIELD

The present disclosure relates generally to the field of barrier coatings, and more particularly to multifunctional barrier coatings configured to provide cosmetic performance, damage protection, antimicrobial performance, and flame, smoke and toxicity (FST) performance in a singular barrier coating composition to improve and simplify component fabrication such as aircraft interior component fabrication.

BACKGROUND

Safety regulations determine the types of materials suitable for use in passenger vehicles. Regarding aircraft interior materials, to which the present disclosure finds particular application, standards developed by the American Society for Testing and Materials (ASTM) include standard test methods for surface flammability of materials and specific optical density of smoke generated by solid materials. These standards are commonly referred to as flame, smoke, and toxicity (FST) requirements, and materials that perform to ASTM FST flame and smoke standards are considered to have flame spread and smoke concentration rates slow enough to allow passengers sufficient time to disembark.

Additives and coatings can be applied to interior surfaces to improve FST performance. For example, flame retardant coatings can be applied to material surfaces to form a barrier between the material surface and the surrounding environment to counteract fire generation and propagation. In addition to improving FST performance, surface coatings are commonly applied to material surfaces to improve cleanability and durability. For example, hydrophobic surface coatings derived from polymers can be applied to improve fluid resistance. In addition to FST performance and cleanability, surface coatings with antimicrobial properties have been developed to mitigate the potential spread of infectious agents. For example, suspensions including antimicrobial agents are commonly used as disinfectants in surface coatings due to their ability to neutralize microbes.

While various types of surface coatings are commercially available, there is no one coating that provides the desired hydrophobicity, resistance to physical contact, chemicals, fluids, UV, etc., antimicrobial performance, and FST performance. As such, conventional coating applications require multiple layers with each layer serving a particular function. Such layered approaches are time consuming, costly to apply, and difficult to achieve the desired effects because of the layering.

In addition, non-cosmetic components that need to be made cosmetic are treated by intermediate processes such as painting, powder coating, and metallization that occur after component fabrication and before barrier coating application. While barrier coatings are intended to be clear so as not to interfere with part cosmetics, coatings may still affect appearance to a degree in terms of color and sheen, particularly when trying to color match bright anodized surfaces, doing metal-to-plastic conversion, and needing to color match metals.

Therefore, what is needed is a barrier coating solution that provides the desired multiple performance characteristics as well as the desired cosmetic characteristics in a singular composition in order to improve component appearance and performance and simplify fabrication.

BRIEF SUMMARY

To achieve the foregoing and other advantages, in a first aspect the present disclosure provides a pigmented multifunctional barrier coating composition for forming a cosmetic, performance-based barrier coating on a component surface, for instance an aircraft interior component surface. The coating composition includes a base coating component in an amount from 5% to 40% by weight of the coating composition, a solvent in an amount from 50% to 70% by weight of the coating composition, and at least two of a flame, smoke, and toxicity (FST) resistive component in an amount from 0.1% to 5% by weight of the coating composition, an ultraviolet (UV) resistive component in an amount from 0.1% to 2% by weight of the coating composition, an antimicrobial component in an amount from 0.1% to 5% by weight of the coating composition, and a dye component in an amount less than 0.5% by weight of the barrier coating forming solution. The coating composition further includes a pigment in an amount up to about 10% by weight of the coating composition.

In some embodiments, the pigment component comprises a mixture of colored pigment and aluminum paste.

In some embodiments, the ratio of colored pigment to aluminum paste in the mixture is about 1:1 to about 2:1.

In some embodiments, the base coating component comprises at least one of a siloxane, a silazane, a fluoro-substituted siloxane or silazane, polymethylsisequioxane, polydimethylsiloxane, and a binder system including a hydrophobic polymer.

In some embodiments, the solvent comprises at least one of an alcohol, water, and an acetate.

In some embodiments, the FST resistive component comprises at least one of clays having a particle diameter size from 1 to 25 microns, graphene, graphite, carbon nanotubes, aluminum trihydrate, an organophosphate, magnesium hydroxide, an antimony oxide, a molybdenum compound, a boron compound, a halogenated compound, melamine, and zinc.

In some embodiments, the UV resistive component comprises at least one of micro-sized or nano-sized titanium dioxide, micro-sized or nano-sized zinc oxide, a UV stabilizer, a hindered amine light stabilizer (HALS), and graphene having a particle diameter size from 0.1 to 25 microns.

In some embodiments, the antimicrobial component comprises at least one of copper, zinc pyrothione, silver, nano-sized silver oxide, graphene having a particle diameter size from 0.1 to 25 microns, a quaternary ammonium compound, a silane quaternary ammonium compound, and triclosan.

In some embodiments, the dye component comprises at least one of 5-[[4-[bis(2-hydroxyethyl)amino]-6-(4-sulfonatoanilino)-1,3,5-triazin-2-yl]amino]-2-[(E)-2-[4-[[4-[bis(2-hydroxyethyl)amino]-6-(4-sulfonatoanilino)-1,3,5-triazin-2-yl]amino]-2-sulfonatophenyl]ethenyl]benzenesulfonate, tetrasodium 4,4'-bis[[4-[bis(2-hydroxyethyl)amino]-6-(4-sulphonatoanilino)-1,3,5-triazin-2-yl]amino]stilbene-2,2'-disulphonate], disodium; 5-[[4-anilino-6-[2-hydroxyethyl(methyl)amino]-1,3,5-triazin-2-yl]amino]-2-[2-[4-[[4-anilino-6-[2-hydroxyethyl(methyl)amino]-1,3,5-triazin-2-yl]amino]-2-sulfonatophenyl]ethenyl]benzenesulfonate, disodium 4,4'-bis(4-anilino-6-morpholino-s-triazin-2-ylamino)-2,2'-stilbenedisulfonate, disodium; 5-[[4-(2-methylanilino)-6-morpholin-4-yl-1,3,5-triazin-2-yl]amino]-2-[2-

[4-[[4-(2-methylanilino)-6-morpholin-4-yl-1,3,5-triazin-2-yl]amino]-2-sulfonatophenyl]ethenyl]benzenesulfonate, hexasodium; 2-[[4-[(3-amino-3-oxopropyl)-(2-hydroxyethyl)amino]-6-[4-[2-[4-[[4-[(3-amino-3-oxopropyl)-(2-hydroxyethyl)amino]-6-(2,5-disulfonatoanilino)-1,3,5-triazin-2-yl]amino]-2-sulfonatophenyl]ethenyl]-3-sulfonatoanilino]-1,3,5-triazin-2-yl]amino]benzene-1,4-disulfonate, fluorescein-SA, Lucifer yellow, sulforhodamine-B or sulforhodamine-101, pyranine, triazine-stilbene, coumarins, imidazolines, diazoles, triazoles, benzoxazoles, and biphenyl stilbenes.

In some embodiments, in the coating composition, the base coating component in provided in an amount from 25% to 35% by weight of the coating composition, the FST resistive component in provided in an amount from 0.5% to 3.5% by weight of the coating composition, and the antimicrobial component in provided in an amount from 0.5% to 2% by weight of the coating composition.

In another aspect, the present disclosure provides a method for forming a cosmetic, performance-based barrier coating on an aircraft interior component. The method includes the steps of providing a pigmented multifunctional barrier coating composition according to the above, applying at least one layer of the coating composition to the surface of the aircraft interior component, and allowing the applied at least one layer of the coating composition to cure or dry to form a barrier coating on the surface of the substrate having a thickness from 7 microns to 10 microns.

In some embodiments, the method further includes the step of, after allowing the applied at least one layer to dry or cure, subjecting a top surface of the formed barrier coating to a nanotexturing process to form a predetermined pattern of spaced upstanding structures in the top surface of the formed barrier coating.

In some embodiments, each of the upstanding structures is shaped as a cone, a cylinder, or a pillar.

In some embodiments, the upstanding structures collectively occupy at least 40% of the predetermined pattern and more preferably at least 80%, spacing between adjacent ones of the upstanding structures is from 0 nanometers to 5 nanometers, and a depth of each of the upstanding structures is from 0.1% to 60% of the total thickness of the formed barrier coating.

Embodiments of the present disclosure can include or more or any combination of the above features and elements.

This brief summary is provided solely as an introduction to subject matter that is fully described in the detailed description. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description. In the following detailed description of embodiments, numerous specific details may be set forth to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly, the present disclosure provides pigmented multifunctional barrier coating compositions for forming cosmetic and appearance-based barrier coatings on components and methods for applying the same to impart a predetermined appearance to a component as well as protect the coated component against damage caused by exposure to use, wear, cleaning agents, disinfectants, chemicals, fluids and UV, among others, while also imparting antimicrobial resistance and improved FST performance.

Figure 1:
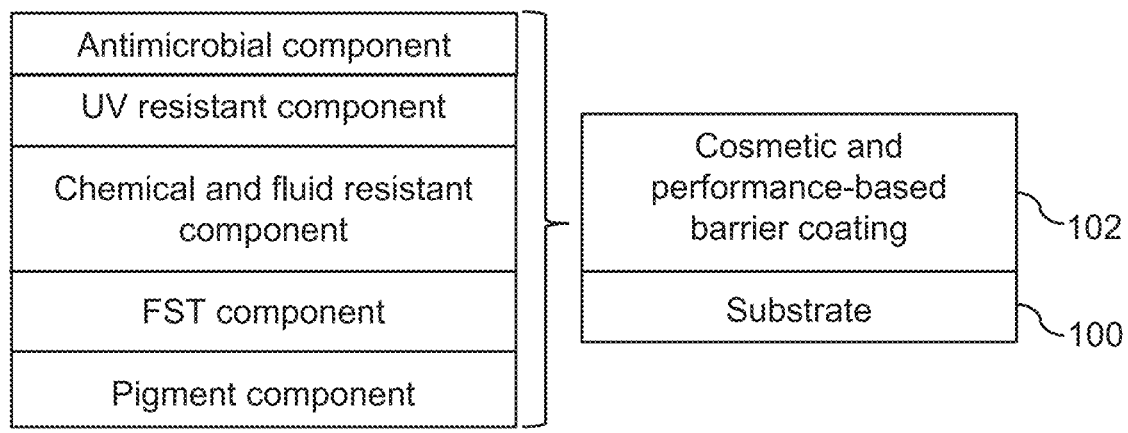
FIG. 1 is a schematic diagram illustrating the make-up of a pigmented, multifunctional barrier coating composition for forming a barrier coating on a surface of a substrate, in accordance with one or more embodiments of the present disclosure.

FIG. 1 illustrates a pigmented multifunctional barrier coating composition, also referred to herein as the "coating composition," according to the present disclosure for application to a component such as an aircraft interior component. The component 100 may be any material or substrate, for instance a high-contact substrate located in a passenger or crew area of a passenger vehicle such as an aircraft, bus, train, ship, etc. Examples of substrate materials include, but are not limited to, synthetic or natural fabric surfaces, plastics, metals, composites and composite finishes, wood, glass, leather, and other substrates. Substrate environments may include, but are not limited to, passenger cabins, crew quarters, lavatories, galleys and cockpits. Other environments may include schools, hospitals, public buildings, etc. In the case of passenger vehicles, the substrate may be an element of a passenger seat, a passenger suite, an interior panel, an overhead bin, a door, a wall, a passenger amenity, a control panel, a passenger service unit, a lavatory fixture, galley equipment, and beverage carts, among others. In some embodiments, the substrate may be an element of a mechanism operable for manipulating another element, for example, a handle, lock, latch, switch, control panel or other high-contact surface.

In embodiments, the present disclosure provides multi-functional barrier coating compositions 102 for forming barrier coatings on substrate surfaces, wherein the formed coating imparts a predetermined cosmetic appearance to the surface and the functionality of the formed barrier coating includes at least one of, and preferably at least two of, self-cleaning, hydrophobicity, fluid resistance, chemical resistance, UV resistance, resistance to wear from physical contact, improved FST performance, and antimicrobial properties.

In some embodiments, the barrier coating solution includes a base coating component in an amount from 5% to 40% by weight of the barrier coating forming solution, and more preferably from 25% to 35% by weight of the barrier coating forming solution. Examples of base coating components include, but are not limited to, siloxanes, silazanes, fluoro-substituted siloxanes or silazanes, polymethylsisequioxane, and polydimethylsiloxane, individually or in combinations thereof. In some embodiments, the base coating component may include a binder system including hydrophobic polymer(s) to form a curable surface coating, for instance a polysiloxane-based surface coating.

In some embodiments, the base coating component may include a binder system such as a curable resin having functional groups contained in the resin as a curing agent, for instance epoxy polymers, polyurethanes, alkyds, melamine polymers, phenolic polymers, polyethylenes, polypropylenes, polystyrenes, saturated polyesters, polyamides, polyvinyl compounds, polyisoprenes, polybutadienes, polystyrene-butadienes, individually or in combinations thereof. In some embodiments, the base coating component may be a polysiloxane-based aqueous coating composition for room-temperature curing, gloss retention and durability in interior applications. Other composite and ultra-violet (UV) resins are envisioned, for instance, resins that improve the compatibility other resins.

In some embodiments, the base coating component includes a hydrophobic polymer to impart increased water repellency and durability of water repellant, as well as resistance to the effects of UV radiation, abrasion and chemical disinfectants. Suitable examples of hydrophobic polymers include, but are not limited to, silicon-based polymers such as polysiloxanes, siloxanes and organofunctional silanes, as well as fluoropolymers, individually or in combinations thereof.

The coating composition further includes a solvent in an amount from 50% to 70% by weight of the barrier coating forming solution. Examples of solvents include, but are not limited to, tetrahydrofuran preferable for providing uniform coating thickness and rapid drying, as well as good working viscosity, alcohols such as isopropanol and ethanol, water, and acetates such as methyl acetate and tert-butyl acetate, individually or in combination. In some embodiments, aqueous solvents may be preferable to organic solvents for environmental and substrate compatibility reasons.

The coating composition further includes an FST resistive/performance enhancing component in an amount from 0.1% to 5% by weight of the barrier coating forming solution, more preferably from 0.5% to 3.5% by weight of the barrier coating forming solution. Examples of FST components include, but are not limited to, micro- or nano-sized clays such as montmorillonite and bentonite which can be functionalized with organosilanes to promote dispersion in the solution, preferably 2D nano-sized (i.e., in the z-direction, meaning stacks that are mono to a few layers), with particle size diameters from 0.1 microns to 25 microns. Other examples of FST components include graphene, carbon nanotubes, graphite, aluminum trihydrate, organophosphates (e.g., ammonium polyphosphate) such as phosphate esters, phosphonates, and phosphinate such as triphenylphosphate and derivatives thereof, chlorophosphates, diphosphates, phosphine oxides, red phosphorus and trialkylphosphates, magnesium hydroxide, antimony oxides, molybdenum compounds (e.g., molybdic oxide, ammonium octamolybdate and zinc molybdate), boron compounds such as barium metaborate and ammonium fluoroborate, decabromo diphenyl ethane, HBCD, tris-tribromophenoxy triazine, melamine and derivatives thereof, melamine cyanurate, zinc stannate, and zinc borate, individually or in combinations thereof.

The coating composition further includes a UV resistant component in an amount from 0.1% to 2% by weight of the barrier coating forming solution. Examples of UV resistant components include, but are not limited to, titanium dioxide preferable micro- or nano-sized, zinc oxide preferably micro- or nano-sized, UV stabilizers such as triazoles, for instance hydroxyphenyl-benzotriazole or derivatives thereof, hindered amine light stabilizers (HALS) such as derivatives of 2,2,6,6-tetramethyl piperidine, and graphene preferably particle diameter sized from 0.1 microns to 25 microns in mono to layer stacks, individually or in combinations thereof.

The coating composition further includes an antimicrobial component in an amount from 0.1% to 5% by weight of the barrier coating forming solution, more preferably from 0.5% to 2% by weight of the barrier coating forming solution. Examples of antimicrobial components may include, but are not limited to, copper, zinc pyrothione, silver, silver oxide preferably nano-sized, graphene preferably in a particle size from 0.1 to 25 microns, quaternary ammonium compounds such as benzethonium chloride, methylbenzethonium chloride, benzalkonium chloride and cetyltrimethylammonium chloride, silane quaternary ammonium compounds such as 3-(trihydroxysilyl) propyldimethyloctadecyl ammonium chloride, and triclosan, individually or in combinations thereof.

Optionally, when desiring coating detectability functionality via fluorescence, the coating composition may include a dye component in an amount less than 0.5% by weight of the barrier coating forming solution. Examples of dyes may include, but are not limited to, fluorescent indicators such as any fluorescent compound capable of absorption in the UV spectrum and emission in the visible spectrum. For example, the fluorescent compound may absorb radiation in the 100-

415 nm wavelength range, more preferably in the 300-415 nm wavelength range, and most preferably in the 365-415 nm wavelength range, and emit radiation in the 100-1000 nm wavelength range, and more preferably emit visible light in the 380-740 nm wavelength range. Suitable fluorescent compounds may be transparent in the presence of visible light and uncolored so as not to alter the color and/or transparency of the coating. Suitable fluorescent compounds can include, but are not limited to, commercially available fluorescent dyes, pigments, colorants and brighteners. A specific, non-limiting example of a suitable fluorescent compound can include 5-[[4-[bis(2-hydroxyethyl)amino]-6-(4-sulfonatoanilino)-1,3,5-triazin-2-yl]amino]-2-[(E)-2-[4-[[4-[bis(2-hydroxyethyl)amino]-6-(4-sulfonatoanilino)-1,3,5-triazin-2-yl]amino]-2-sulfonatophenyl]ethenyl] benzenesulfonate.

In some embodiments, the fluorophoric dye compounds may be anionic dye compounds of λex<500 nm and λem>400 nm may be ideally invisible under normal visible light and fluoresce under UV light (e.g., tetrasodium 4,4'-bis[[4-[bis(2-hydroxyethyl)amino]-6-(4-sulphonatoanilino)-1,3,5-triazin-2-yl]amino]stilbene-2,2'-disulphonate], disodium; 5-[[4-anilino-6-[2-hydroxyethyl(methyl)amino]-1,3,5-triazin-2-yl]amino]-2-[2-[4-[[4-anilino-6-[2-hydroxyethyl(methyl)amino]-1,3,5-triazin-2-yl]amino]-2-sulfonatophenyl]ethenyl]benzenesulfonate, disodium 4,4'-bis(4-anilino-6-morpholino-s-triazin-2-ylamino)-2,2'-stilbenedisulfonate, disodium; 5-[[4-(2-methylanilino)-6-morpholin-4-yl-1,3,5-triazin-2-yl]amino]-2-[2-[4-[[4-(2-methylanilino)-6-morpholin-4-yl-1,3,5-triazin-2-yl]amino]-2-sulfonatophenyl]ethenyl]benzenesulfonate, hexasodium; 2-[[4-[(3-amino-3-oxopropyl)-(2-hydroxyethyl)amino]-6-[4-[2-[4-[[4-[(3-amino-3-oxopropyl)-(2-hydroxyethyl)amino]-6-(2,5-disulfonatoanilino)-1,3,5-triazin-2-yl]amino]-2-sulfonatophenyl]ethenyl]-3-sulfonatoanilino]-1,3,5-triazin-2-yl]amino]benzene-1,4-disulfonate, and related, as well as fluorescein-SA, Lucifer yellow, sulforhodamine-B or sulforhodamine-101, pyranine, HPTS or HPTS (Lys)3, MPTS, CTR, TSPP, TCPP, PTCA), Dyes (<0.5 wt %), triazine-stilbene, coumarins, imidazolines, diazoles, triazoles, benzoxazoles, and biphenyl stilbenes, individually or in combinations thereof.

The coating composition further includes a pigment component for imparting a particular cosmetic appearance to the component. Considering the coating includes both cosmetic and performance-based components, the coating composition obviates the need for separate processed after fabrication and before application of the barrier coating, for example, painting, powder coating and metallization processes. Preferred pigments are those capable of being admixed and evenly dispersed into the thin, i.e., 7 microns to 10 microns thick polymeric barrier coating matrix.

Preferred pigment components include, but are not limited to, those capable of producing a bright anodized aluminum appearance. Non-limiting examples of pigment components include mixtures of colored pigments and aluminum pastes in predetermined ratios such as about or between 1:1 and 2:1. A particular example was formulated by mixing around 100 grams of SAV-100D with around 2.14 grams of NDF 120 aluminum paste available from Eckart America Corporation of Painesville, Ohio. The loading level of the aluminum paste in this case was about 10% by weight of the coating composition. Other pigments used to obtain a suitable pigmented SAV-100 include a white pigment such as HP 3106 available from Eagle Specialty Products of St. Louis, Missouri, which is a paste having a solid content of around 81.2%. The loading level of the pigment may be limited to about 10% by weight in solid and different aluminum/white ratios may be used, such as 1/1 and 1/2, when pigmenting the SAV-100D formulation. Another pigment suitable for use is the white pigment SYMIC B001 also available from Eckart America Corporation in powder form containing 50-70% fluorphlogopite and 30-50% TiO2 for being mixed with SAV-100D at 10%. In embodiments, the pigment component may be one or more of titanium dioxide liquid pigment dispersion concentrate, zinc oxide, lithopone, barium carbonate, antimony oxide, calcium carbonate, and tin oxide, preferably solvent borne for coating application.

Figure 2:
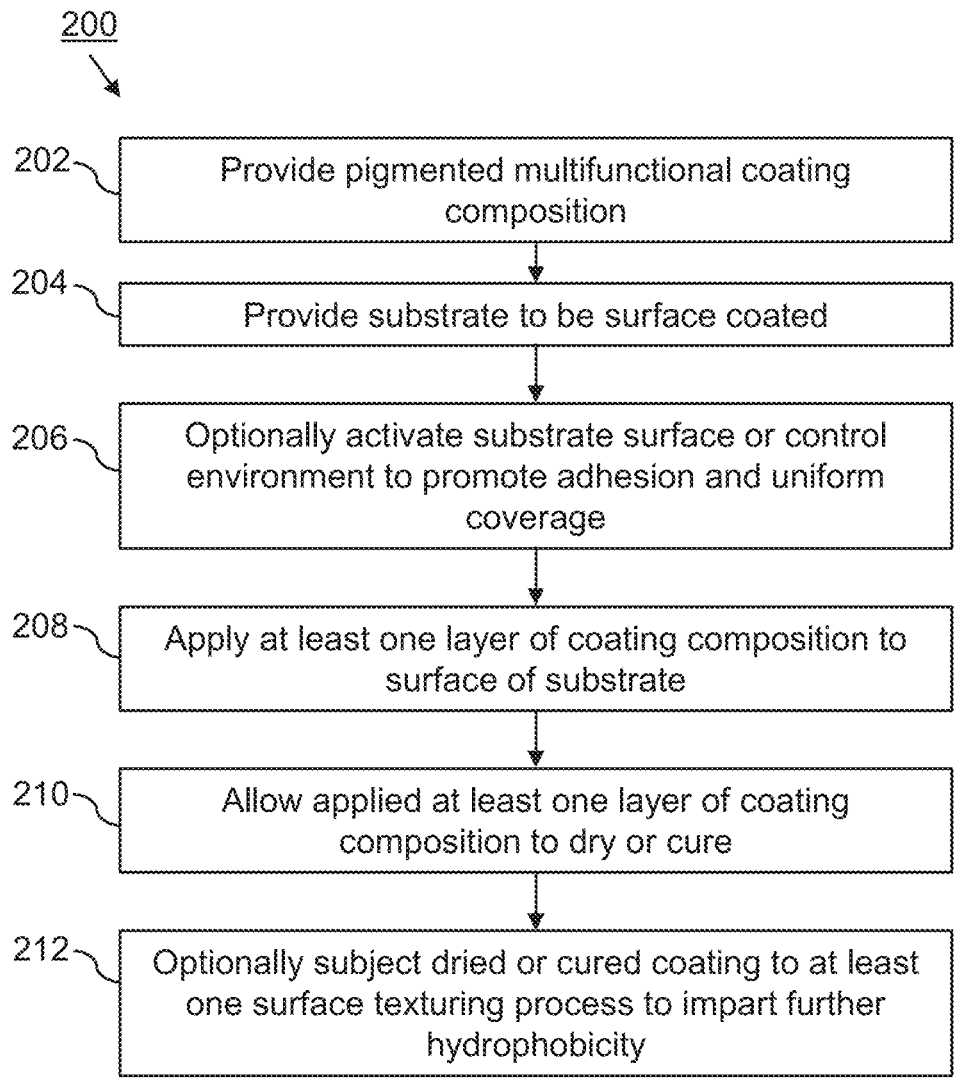
FIG. 2 is a flow diagram illustrating a method for forming a cosmetic and performance-based barrier coating on a substrate and optionally surface texturing the formed barrier coating to impart further hydrophobicity, in accordance with one or more embodiments of the present disclosure.

FIG. 2 illustrates a method for forming a cosmetic and performance-based barrier coating on a component surface generally at 200. In a Step 202, a pigmented multifunctional coating composition according to the above is provided. In a Step 204, a component having a surface to be surface coated is provided, for instance an aircraft interior component as described above. In an optional Step 206, the surface of the component may be pre-treated or otherwise activated to promote adhesion of the barrier coating to be formed on the surface. For example, activation treatments may include, but are not limited to, the application of heat, vacuum, primer, plasma, corona, UV/ozone, and chemical, individually or in combination, to promote uniform surface coating with enhanced adhesion/binding between the substrate and the formed coating. Substrate preparation, prior to coating application, may include one or more of cleaning, etching, heating, etc. In embodiments, the activation may improve the durability of the formed barrier coating. Activation techniques may be implemented prior to, during, or subsequent to barrier coating solution application, for instance under controlled conditions.

In a Step 208, the coating composition is applied to the surface of the substrate. Application techniques may include electrostatic spray application, dipping, wiping, brushing, spraying or other application method, individually or in combination. In a Step 210, the applied barrier coating forming solution is allowed to dry or cure on the surface, such as under ambient or controlled conditions. In some embodiments, the solution may be allowed to stand on the surface for a predetermined time duration, for example, about 30 minutes to about 6 hours to form the barrier coating. Excess (e.g., unbonded) barrier coating solution may be removed in one or more optional rinsing steps and the coated component may be dried in one or more optional drying steps. Additional/optional steps may include applying at least one second surface coat atop the applied first or previous coat and allowing the at least one additional coat to dry or cure. In some embodiments, formed surface coating films have a thickness ranging from less than 1 mm to greater than several micrometers, depending on application, for example, a thickness between about 7 microns and about 10 microns may be preferred.

In an optional Step 212, the formed at least one barrier coating is subjected to a process(es) for texturing (i.e., increasing surface roughness) the top surface of the at least one formed barrier coating. Texturing processes may include, but are not limited to, femtosecond and picosecond laser sweeping across the surface using an automated system to form a predetermined pattern at depth in the surface. Increasing the surface roughness enhances the hydrophobic behavior of the barrier coating, such that fluid droplets on top of the barrier coating tend to become near spherical. As a result, the droplets roll away from the surface because of the small adhesion energy and small contact area between the fluid and the nanotextured barrier coating. The hydrophobicity of the barrier coating is determined by both the chemical composition and the geometrical nanostructure of the barrier coating surface.

Figure 3A:
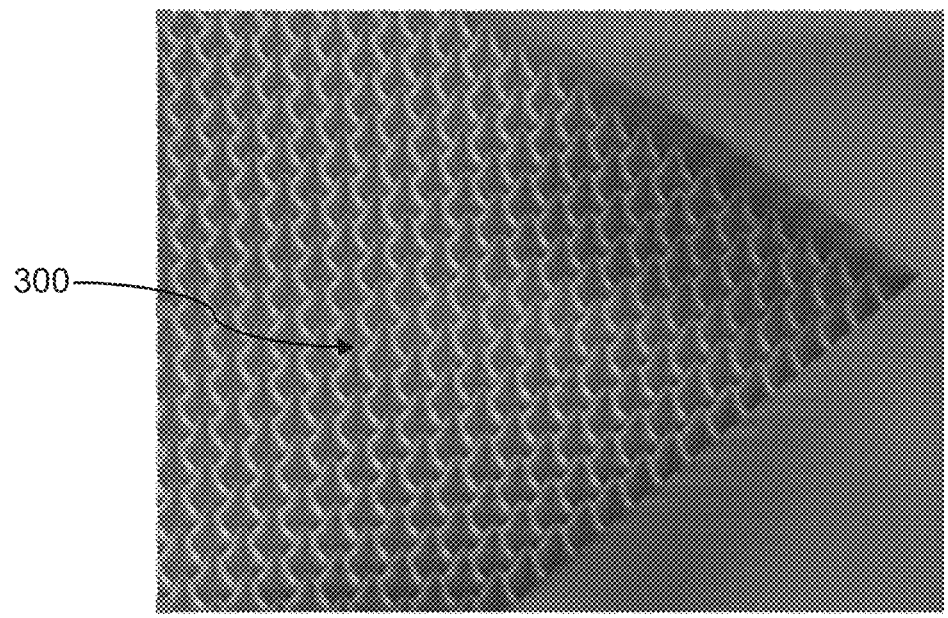
FIGS. 3A and 3B are microscopic images of surfaced textured formed barrier coatings, in accordance with one or more embodiments of the present disclosure.
Figure 3B:
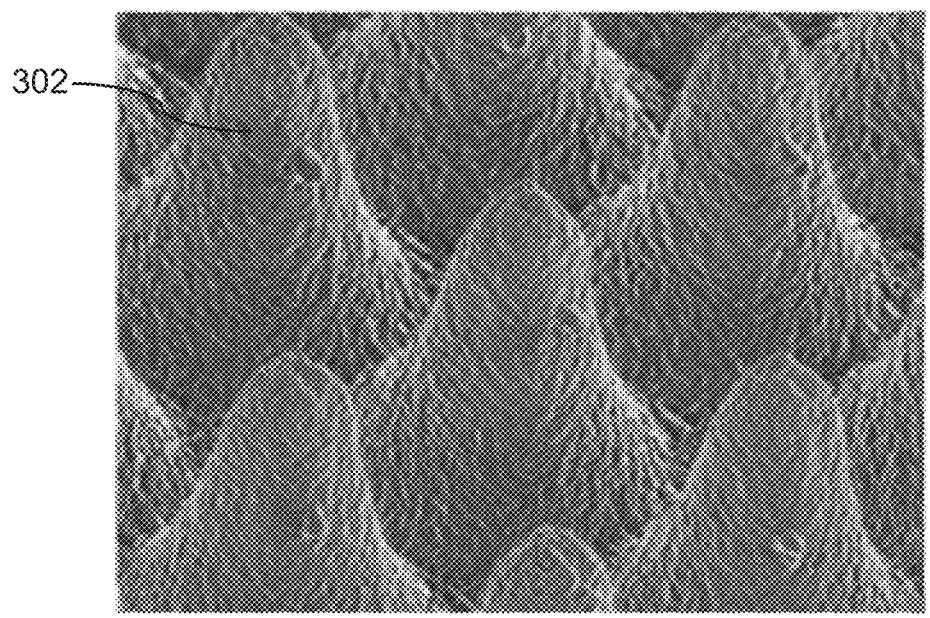

The present inventors have found that coatings that impart barrier properties, as well as antimicrobial properties, can be nanotextured as a second step, following a first step of barrier coating application and formation, to impart or improve hydrophobic properties while maintaining the durability of the base coating. Preferable surface texturing includes nanotexturing to produce predetermined patterns of spaced upstanding structures. In some embodiments, the upstanding structures are cones, cylinders or pillars. As illustrated in FIG. 3A, a predetermined pattern 300 is formed in the surface of a barrier coating using a laser texturing process according to the present disclosure. FIG. 3B shows a magnification of the predetermined pattern to illustrate spaced formed cones 302. In embodiments, the upstanding structures collectively occupy at least 40% of the predetermined pattern, more preferably at least 80% of the predetermined pattern. In other words, the density of the formed structures should be significant in order to achieve maximum packing and protection of the surface underneath. In some embodiments, spacing between adjacent ones of the upstanding features is from 0 nanometers to 5 nanometers (e.g., 0 nanometers to 5 nanometers in each of the X- and Y-directions), measured from a center, base or tip or the formed structures. In some embodiments, a depth of the upstanding features is preferably from 0.1% to 60% of the total thickness of the formed barrier coating, depending on the total thickness of the barrier coating, such that the laser texturing does not penetrate the entire coating thickness.

In further optional steps, after the barrier coating is formed, an initial assessment of the barrier coating may be performed by subjecting the substrate under test to a quantifiable measurement technique. The initial assessment of the formed barrier coating may serve to determine the quality of the initially formed barrier coating, and assuming a quality/satisfactory initial coating, may serve as a baseline against which future barrier coating assessments of the substrate are compared. The quantifiable measurement technique may include performing a measurement of a liquid to solid angle of contact. The contact angle of a liquid, for instance a droplet of water, applied atop the freshly formed barrier coating provides quantifiable information associated with the interaction between the applied fluid and the coated surface. More particularly, the applied liquid will wet the surface to a degree depending on the properties of the surface, and a formed barrier coating should provide a different contact angle as compared to a surface lacking a barrier coating.

In some embodiments, an initial or refence contact angle measurement may serve as the 100% measurement indicative of a 'new' barrier coating. In further steps, additional contact angle measurements may be taken at one or more predetermined time durations after initial formation, for example after hours, days, weeks, months, or years following in use service, and the algorithm can be used to determine a percentage difference corresponding to barrier coating degradation. The amount of measured degradation may be used to determine the need for barrier coating re-application or component replacement. For example, different measured contact angles may correspond to, for example, 75% barrier coating integrity, 50% barrier coating integrity, or 25% barrier coating integrity, or other, and the percentage may be used to determine the need for re-application or replacement. The algorithm may include different contact angle measurements corresponding to percentages of barrier coating integrity or life-remaining, which can be used to monitor the status of the barrier coating indicative of barrier coating performance. While the contact angle measurement may be an indicator of hydrophobicity performance of the barrier coating, the same can be used to determine the general state of the barrier coating, and consequently the performance state of the other functionalities of the multifunctional barrier coating.

The measurement step may include subjecting the substrate to a predetermined process configured to effect a change in the formed barrier coating. For example, with formed barrier coatings including a fluorescence capable dye component as discussed above, UV light may be directed to the substrate and the measurement technique may include comparing an intensity or amount of fluorescence compared to a predetermined threshold value and/or compared to an initial or refence fluorescence measurement. In some embodiments, intensity level data for a particular substrate may be saved for comparison against future data to track wear and/or coating performance. In some embodiments, the methods disclosed herein can be used to determine the level of coating wear between areas of a substrate by comparing the level of intensity between different predetermined areas. For example, obtained data can be used to determine frequent touchpoints that may require more frequent recoating, more robust coating, and/or additional coating layers. In an optional step, the substrate under test may be flagged for further action, for instance reapplication, servicing or replacement of the associated substrate, element or component. Methods according to the present disclosure can be used to verify the presence or absence of the applied barrier coating, for example, to verify the application and quality of the barrier coating during manufacturing and/or detect wear in the barrier coating during service.

Wear may be quantifiable as a reduction in luminosity of the fluorescent indicators under a wavelength of light. As luminosity of the fluorescent indicators may be reduced over time, the efficacy of the coating may be negatively correlated to a wear associated with the surface and a time since the barrier coating was applied. Thus, both the efficacy of the coating and the luminosity of the fluorescent indicator are negatively correlated to a wear and a time (e.g., as the fluorescent indicator is worn from the surface, the coating may be similarly worn). A correlation between the efficacy and the luminosity may thus be determined by a model.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

What is claimed is:

1. A pigmented multifunctional barrier coating composition for application to a component, comprising:
a base coating component in an amount from 5% to 40% by weight of the coating composition;
a solvent in an amount from 50% to 70% by weight of the coating composition;
performance components including a flame, smoke, and toxicity (FST) resistive component in an amount from 0.1% to 5% by weight of the coating composition, an ultraviolet (UV) resistive component in an amount from 0.1% to 2% by weight of the coating composition, an antimicrobial component in an amount from 0.1% to 5% by weight of the coating composition, and a dye component in an amount less than 0.5% by weight of the barrier coating forming solution; and a pigment component in an amount up to about 10% by weight of the coating composition, the pigment component comprising a mixture of colored pigment and aluminum paste, wherein a ratio of the colored pigment to the aluminum paste in the pigment component is from 1:1 to 2:1.

2. The coating composition according to claim 1, wherein the pigment component includes one or more of titanium dioxide liquid pigment dispersion concentrate, zinc oxide, lithopone, barium carbonate, antimony oxide, calcium carbonate, and tin oxide.

3. The coating composition according to claim 1, wherein the base coating component comprises at least one of a siloxane, a silazane, a fluoro-substituted siloxane or silazane, polymethylsisequioxane, polydimethylsiloxane, and a binder system including a hydrophobic polymer.

4. The coating composition according to claim 1, wherein the solvent comprises at least one of an alcohol, water, and an acetate.

5. The coating composition according to claim 1, wherein the FST resistive component comprises at least one of clays having a particle diameter size from 1 to 25 microns, graphene, graphite, carbon nanotubes, aluminum trihydrate, an organophosphate, magnesium hydroxide, an antimony oxide, a molybdenum compound, a boron compound, a halogenated compound, melamine, and zinc.

6. The coating composition according to claim 1, wherein the UV resistive component comprises at least one of micro-sized or nano-sized titanium dioxide, micro-sized or nano-sized zinc oxide, a UV stabilizer, a hindered amine light stabilizer (HALS), and graphene having a particle diameter size from 0.1 to 25 microns.

7. The coating composition according to claim 1, wherein the antimicrobial component comprises at least one of copper, zinc pyrothione, silver, nano-sized silver oxide, graphene having a particle diameter size from 0.1 to 25 microns, a quaternary ammonium compound, a silane quaternary ammonium compound, and triclosan.

8. The coating composition according to claim 1, wherein the dye component comprises at least one of 5-[[4-[bis(2-hydroxyethyl)amino]-6-(4-sulfonatoanilino)-1,3,5-triazin-2-yl]amino]-2-[(E)-2-[4-[[4-[bis(2-hydroxyethyl)amino]-6-(4-sulfonatoanilino)-1,3,5-triazin-2-yl]amino]-2-sulfonatophenyl]ethenyl]benzenesulfonate, tetrasodium 4,4'-bis[[4-[bis(2-hydroxyethyl)amino]-6-(4-sulphonatoanilino)-1,3,5-triazin-2-yl]amino]stilbene-2,2'-disulphonate], disodium; 5-[[4-anilino-6-[2-hydroxyethyl(methyl)amino]-1,3,5-triazin-2-yl]amino]-2-[2-[4-[[4-anilino-6-[2-hydroxyethyl(methyl)amino]-1,3,5-triazin-2-yl]amino]-2-sulfonatophenyl]ethenyl]benzenesulfonate, disodium 4,4'-bis(4-anilino-6-morpholino-s-triazin-2-ylamino)-2,2'-stilbenedisulfonate, disodium; 5-[[4-(2-methylanilino)-6-morpholin-4-yl-1,3,5-triazin-2-yl]amino]-2-[2-[4-[[4-(2-methylanilino)-6-morpholin-4-yl-1,3,5-triazin-2-yl]amino]-2-sulfonatophenyl]ethenyl]benzenesulfonate, hexasodium; 2-[[4-[(3-amino-3-oxopropyl)-(2-hydroxyethyl)amino]-6-[4-[2-[4-[[4-[(3-amino-3-oxopropyl)-(2-hydroxyethyl)amino]-6-(2,5-disulfonatoanilino)-1,3,5-triazin-2-yl]amino]-2-sulfonatophenyl]ethenyl]-3-sulfonatoanilino]-1,3,5-triazin-2-yl]amino]benzene-1,4-disulfonate, fluorescein-SA, Lucifer yellow, sulforhodamine-B or sulforhodamine-101, pyranine, triazine-stilbene, coumarins, imidazolines, diazoles, triazoles, benzoxazoles, and biphenyl stilbenes.

9. The coating composition according to claim 1, wherein:
the base coating component is provided in an amount from 25% to 35% by weight of the coating composition;
the FST resistive component is provided in an amount from 0.5% to 3.5% by weight of the coating composition; and
the antimicrobial component is provided in an amount from 0.5% to 2% by weight of the coating composition.

* * * * *